(No Model.)
G. A. RUNG.
SOUNDING APPARATUS.
No. 466,128. Patented Dec. 29, 1891.
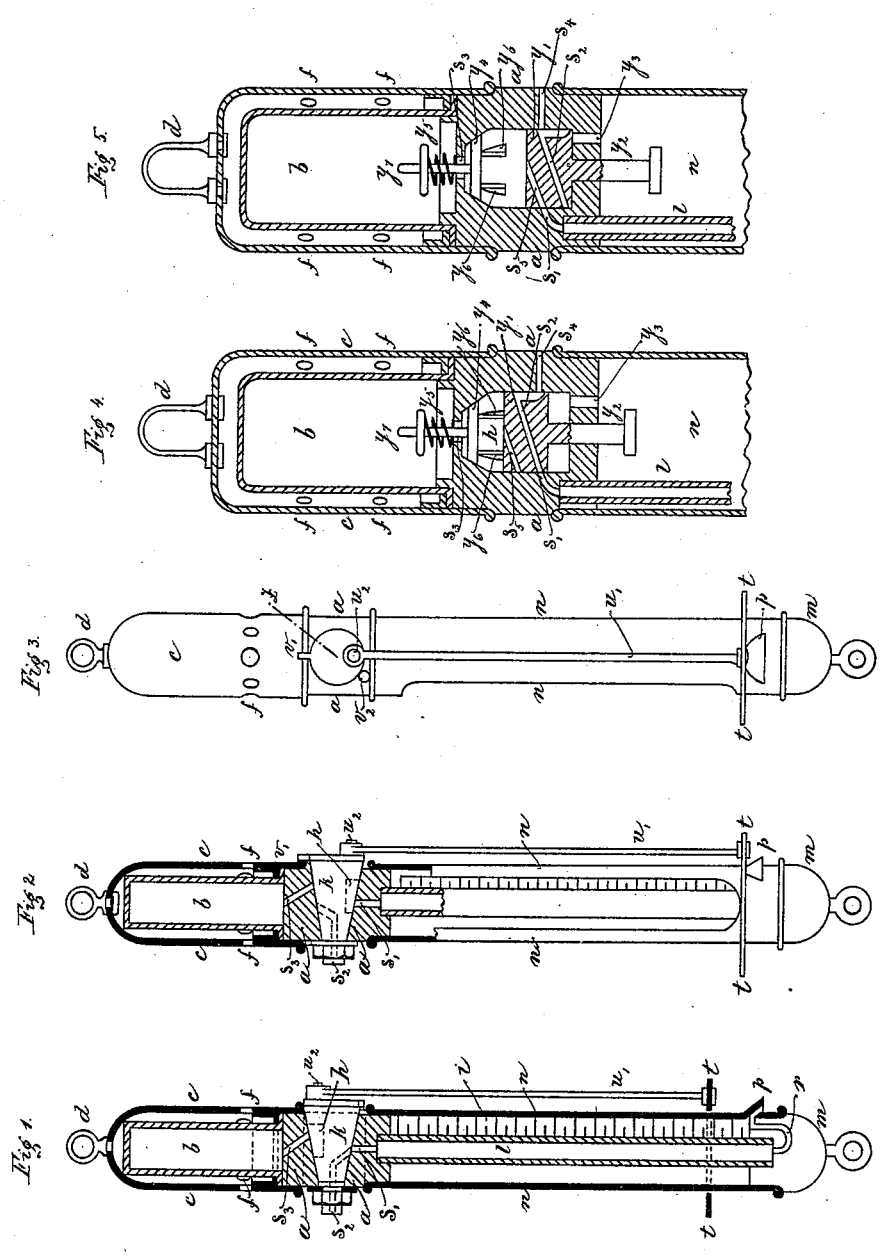
Witnesses:
Marion Hall
Charles Schroeder
Inventor
G. A. Rung
by Goepel & Raegener
Attorneys.

UNITED STATES PATENT OFFICE.

GEORG ADOLPH RUNG, OF COPENHAGEN, DENMARK.

SOUNDING APPARATUS.

SPECIFICATION forming part of Letters Patent No. 466,128, dated December 29, 1891.

Application filed May 4, 1891. Serial No. 391,512. (No model.)

*To all whom it may concern:*

Be it known that I, GEORG ADOLPH RUNG, a citizen of Denmark, and a resident of Copenhagen, Denmark, have invented certain new and useful Improvements in Sounding Apparatus, of which the following is a specification.

This invention relates to improvements in instrument or apparatus for sounding or measuring the depth of water. When a tube closed at one end is immersed mouth downward in water, the water will enter the same and thereby compress or diminish the volume of the air in the tube. This space filled by the compressed air will, according to Mariotte's law, vary in inverse ratio to the pressure, the temperature being constant. In consequence of this the actual alteration in the volume of the air does not correspond directly with the depth to which the apparatus is immersed. Different forms of apparatus have been designed by Sir William Thomson and by others for measuring depth by the compression of air in a tube and are so constructed that it is possible after the apparatus has been drawn up to observe how far the water ascended in the tube contained therein. However, as the divisions of the scale for successive depths become smaller and smaller, the measuring of single meters or of small differences in depth very soon becomes impossible. In fact, it is impossible with such apparatus to measure depths of over two hundred meters in a satisfactory manner. There is, however, another way of utilizing Mariotte's law, whereby it is possible not only to employ a scale having divisions of equal size, but it is also possible to measure any depth of water. This method is based on the fact that the density of air is simply proportional to the pressure.

The instrument or apparatus for measuring depths constructed according to this invention carries with it a quantity of air sufficient for all depths inclosed in an air-chamber, this air being compressed during immersion to a degree proportional to the depth. When the bottom or the desired depth is reached, a certain constant volume of the compressed air is cut off. The compressed air cut off in this manner is then allowed while the instrument is being drawn up or afterward to expand in a measuring-tube, where its volume under the pressure of the atmosphere after the instrument has been drawn up can be read off. This latter volume will be proportional to the depth to which the instrument has been immersed, and thus serves as a measure of the same. While the instrument is being immersed or sunk in the water the measuring-chamber for measuring the aforesaid constant volume of air is in communication with the air-chamber and is shut off from the measuring-tube, which is filled with water; but when the instrument is being drawn up the measuring-chamber is shut off from the air-chamber, and at the same time or after drawing up it is placed in communication with the measuring-tube. The communication between the measuring-chamber and either the air-chamber or the measuring-tube may be controlled by means of cocks, valves, or slides of different kinds operated by the instrument striking against the bottom, by falling weights along the sounding lead line, by propellers or vanes, by the difference of the water-pressure in its action during the ascent and descent of the instrument, or even by the force which is capable of being exerted while the instrument is being drawn up by an amount of air compressed in a space provided for this purpose.

Different scales or values for the divisions may be obtained in one and the same apparatus, either by varying the volume of the measuring-chamber or varying the cross-section of the measuring-tube.

The details in the construction of the apparatus may be varied considerably, the following features being usually present: first, an air-chamber in which the air is gradually compressed by the pressure of the water while the apparatus is being immersed or sunk in the water; second, a measuring-chamber in which a certain volume of the air compressed by the water is measured off and shut off when the apparatus has reached the depth of water to be measured; third, a cylindrical measuring-tube composed of a glass tube, which, during the immersion or descent through the water, is kept filled with water, being then open at both ends, the said tube being, however, first closed at the top as soon as the apparatus begins to be drawn up, and being then placed in communication with the measuring-chamber during or after the drawing up, so that the compressed air in the said measuring-chamber will expand into the measuring-tube and will by its expansion drive a corresponding quantity of water out at the lower end of the same. Along the measuring-tube are provided divisions corresponding to different depths of water.

In the accompanying drawings, Figure 1 is a vertical central section showing the parts in the position they occupy during the sinking of the apparatus. Fig. 2 is a similar view showing the parts during the raising of the same. Fig. 3 is a side elevation of the apparatus, and Figs. 4 and 5 are vertical central sections of a modification of the apparatus.

Similar letters refer to corresponding parts.

The air-chamber is formed of a rubber cap $b$, provided with a bottom flange, said cap being held on the top of a perforated body-piece $a$ by means of a protective casing $c$, which is fastened to the said piece $a$ and is provided with an interior projection which rests on the bottom flange of the rubber cap, as shown in Figs. 1, 2, 4, and 5. This cap is of such a nature that it will be compressed by a very slight pressure, but will immediately expand again of itself as soon as the pressure is removed.

In the protective casing $c$, which is provided at top with an eye or ring $d$ for the purpose of attaching the apparatus to the end of the sounding lead or line, are suitable lateral holes $f$, through which the water can enter in order to act upon the rubber cap $b$. The measuring-chamber is in this case formed by a recess $h$ in the one side of a cock or plug $k$, inserted in the perforated piece $a$. The measuring-tube $l$ is inserted with its scale $i$ in a second protective casing $n$, which is attached to the lower end of the piece $a$, said casing $n$ being cut away or perforated on the front side, as shown in Figs. 2 and 3, so that the glass tube $l$ and its scale $i$ can be seen, and being also provided below with a ring for the attachment thereto of an ordinary sounding-lead.

In order to facilitate the entry of the water into the measuring-tube, the casing is further provided in its lower part with a lateral opening, above which is an inclined guard $p$, which facilitates the entry of the water during the immersion or sinking of the apparatus. The water passes through the U-shaped passage $r$ into the glass tube $l$, and the air in the same escapes at the same time at the top through the passage $s'$ in the perforated piece $a$ and the passage $s^2$ in the cock or plug $k$, the position of which is adjusted by hand before the instrument is immersed, and in which said position the measuring-chamber $h$ is also in communication by the passage $s^3$ in the perforated piece $a$ with the air-chamber $b$. When the drawing up of the apparatus commences after the downward movement is completed, the pressure of the water against an annular disk $t$ (which surrounds the lower part of the apparatus) effects a rotation of the cock or plug $k$ into the position shown in Figs. 2 and 3, the disk or the ring $t$ being connected by a rod $u'$ with a pin $u^2$, which is mounted eccentrically on one end of the cock or plug. As may be seen from Fig. 2 the measuring-tube $l$ now passes out of communication with the channel $s^2$, so that its upper end is shut off, and then into communication with the measuring-chamber $h$. When the instrument is then drawn up, the compressed air will expand gradually in the measuring-chamber and drive a corresponding amount of water out of the measuring-tube through the passage $r$ at its lower end, and when the instrument has been completely drawn up the upper surface of the water column remaining in the measuring-tube will indicate on the scale $i$ the depth of water to which the apparatus has been immersed. The annular disk may also be replaced by two plates which can be turned down after the rotation of the cock, in order that they shall not offer any resistance to the water during drawing up.

$v'$ is a projection on the side of the cock or plug $k$, which, by striking against a corresponding pin $v^2$ on the perforated piece $a$, indicates to what extent the cock must be rotated by hand in order to render the apparatus ready for use. The pin $u^2$ then assumes the position shown by the line Z in Fig. 3.

Figs. 4 and 5 illustrate in vertical central section a second example of the construction of the apparatus, respectively, during the immersion and during the drawing up of the apparatus. The figures of reference in these two figures correspond with those of Figs. 1 and 3. The measuring-chamber $h$ is in this case formed in the piece $a$. It is cylindrical and is closed at bottom by the movable plunger $y'$, with its operating-rod $y^2$. It communicates at the top by means of the passage $s^3$ with the air-chamber $b$; but when there is no increase of pressure in the air-chamber the communication is kept closed by a cone-valve $y^4$ and a spiral spring $y^5$, which surrounds the stem $y^7$ on the valve-piece.

When the apparatus is to be used, the lower end of the operating-rod $y^2$ is pressed from below until the plunger $y'$ is thereby brought into the position shown in Fig. 4, in which it is held by suitable projections, which may also serve as guides for the valve-piece $y^4$. The upper end of the measuring-tube $l$ is then open through the passages $s'$ and $s^4$ in the piece $a$ and $s^2$ in the plunger $y'$. During the immersion of the apparatus in the water the increasing pressure in the air-chamber $b$ produced by the immersion will open the cone-valve $y^4$, so that the air-pressure in the air-chamber will be transmitted through the passage $s^3$ in the piece around the valve-rod $y^7$ down into the measuring-chamber $h$. Since the water-pressure is transmitted through the passage $y^3$ in the piece $a$, also to the under side of the plunger $y'$, the increasing pressure at its upper side will not move the plunger. As soon as the apparatus has arrived at the desired depth and the drawing up of the same is then begun the decrease in the water-pressure will have for result that the valve $y^4$ will be closed by the spiral spring $y^5$ and that the plunger $y'$ will be pressed downward gradually into the position shown in Fig. 5 by the compressed air in the measuring-chamber during the expansion of the same. While the plunger $y'$ is being pressed down, the passage $s'$ is then brought out of communication with the passage $s^2$, so that the upper end of the measuring-tube is closed, and then the passage $s'$ comes into communication with another passage $s^5$ in the plunger $y'$, the latter passage opening at top into the measuring-chamber $h$. The measuring-chamber $h$ comes in consequence into communication with the measuring-tube, which has for result that the air in the same will expand during the further drawing up of the apparatus and will pass into the measuring-tube, at the same time driving out a corresponding amount of water out of the tube, as above described in connection with the apparatus illustrated in Figs. 1 to 3. It should be understood, however, that the apparatus shown in Figs. 4 and 5 is not suitable for measuring such small depths or differences in depth as the apparatus shown in Figs. 1 to 3.

In order to restore to the air-chamber the quantity of air withdrawn at each measurement—namely, that which is taken up in a compressed state into the measuring-chamber—a cock or valve may be provided on the two forms of apparatus described above to enable the air-chamber to be placed for an instant in communication with the atmosphere before the next measurement is made.

Having now particularly described and ascertained the nature of the said invention and in what manner the same is to be performed, I declare that what I claim is—

1. In an instrument or apparatus for sounding or measuring the depth of water, the combination, with a body-piece in which a measuring-chamber is formed, a compressible air-chamber on said body-piece, a measuring-tube connected with said body-piece, and channels for conducting compressed air from the compressible air-chamber to the measuring-chamber and from the measuring-chamber to the measuring-tube, of a valve or cock in the body-piece and means for automatically shifting said cock when the device is moved upward, substantially as set forth.

2. In an instrument or apparatus for sounding or measuring the depth of water, the combination, with a body-piece, of a plug or valve in the same, a compressible air-chamber on said body-piece, which piece is provided with a channel connecting the air-chamber with the plug or valve, a measuring-tube connected with said piece, the piece having a channel connecting the measuring-tube with the plug or valve, said plug or valve having a channel extending to the end of the same and also having a recess forming a measuring-chamber, and means for automatically shifting the valve to shut off the air-chamber from the measuring-chamber when the device is moved upward in the water, substantially as set forth.

3. In a device or apparatus for sounding and measuring the depth of water, the combination, with a body-piece, of a plug mounted to turn in the same and provided with a recess forming a measuring-chamber and also provided with channels, a compressible air-chamber connected with said piece, a measuring-tube connected with said piece, a vertically-movable disk mounted on the device, and a rod connecting said disk with an eccentric-pin of the plug, substantially as set forth.

In testimony that I claim the foregoing as my invention I have signed my name in presence of two subscribing witnesses.

GEORG ADOLPH RUNG.

Witnesses:
H. NEOLM,
A. J. PARDOE.